United States Patent [19]

Coates

[11] 4,158,165

[45] Jun. 12, 1979

[54] APPARATUS AND METHOD FOR DETERMINING SUBSURFACE FORMATION PROPERTIES

[75] Inventor: George R. Coates, Houston, Tex.

[73] Assignee: Schlumberger Technology Corporation, New York, N.Y.

[21] Appl. No.: 806,983

[22] Filed: Jun. 16, 1977

[51] Int. Cl.² .......................... G01V 3/18; G01V 3/12
[52] U.S. Cl. .......................................................... 324/6
[58] Field of Search ............................................. 324/6

[56] References Cited

U.S. PATENT DOCUMENTS

| 3,944,910 | 3/1976 | Rau | 324/6 |
|---|---|---|---|
| 3,982,176 | 9/1976 | Meador | 324/6 |
| 4,009,434 | 2/1977 | McKinlay | 324/6 |
| 4,012,689 | 3/1977 | Cox et al. | 324/6 |
| 4,052,662 | 10/1977 | Rau | 324/6 |
| 4,063,151 | 12/1977 | Suau et al. | 324/6 |
| 4,077,003 | 2/1978 | Rau | 324/6 |

*Primary Examiner*—Gerard R. Strecker
*Attorney, Agent, or Firm*—Martin M. Novack; Kenneth Olsen; Bruce N. Carpenter

[57] ABSTRACT

The disclosure is directed to an apparatus and method for determining the water-filled porosity of formations surrounding a borehole. Alternatively, where porosity is known from other logging information, the disclosed techniques can be utilized for determining the conductivity of the water in formations surrounding a borehole or for determining water saturation. The formations are assumed to comprise a matrix, which may be any subsurface solid material, and fluids contained in the matrix, such as in pore spaces or interstices therein. In accordance with one embodiment, means are provided for deriving a first quantity which is representative of the attenuation of microwave electromagnetic energy propagating between spaced locations in the borehole, the first quantity being, for example, the attenuation constant, $\alpha$. Means are also provided for deriving a second quantity representative of the relative phase shift of microwave electromagnetic energy propagating between the spaced locations, the second quantity being, for example, the phase constant, $\beta$. Further means are provided for deriving a third quantity representative of the conductivity of the water in the formations surrounding the spaced locations. In the preferred form of the invention, the investigated formations are in the invaded zone surrounding the borehole and the conductivity of the water is determinable from the conductivity of the drilling mud being utilized and the nature of the mud filtrate resulting from invasion of the formations by the drilling mud. Means are also provided for generating a fourth quantity which is proportional to the product of the first and second quantities and inversely proportional to the third quantity. The generated fourth quantity is indicative of the water-filled porosity, $\phi_w$, of the formations adjacent the region of the spaced locations in the borehole. In alternative forms of the invention, where porosity is known, the conductivity, $\sigma_w$, or the apparent conductivity, $\sigma_w'$, of the water in formations surrounding the borehole is determined.

68 Claims, 7 Drawing Figures

APPARATUS AND METHOD FOR DETERMINING SUBSURFACE FORMATION PROPERTIES

BACKGROUND OF THE INVENTION

This invention relates to techniques for investigating subsurface formations surrounding a borehole and, more particularly, to an apparatus and method for determining the volume of water or the conductivity of the water contained in subsurface formations.

Well logging techniques for determining the resistivity or conductivity of subsurface formations have been in existence for many years. The resistivity or conductivity of formations has traditionally been measured at relatively low frequencies, either by direct detection of signal levels as between spaced electrodes or by induction logging. The measured electrical coductivity of subsurface formations is largely a function of the volume of water in the formations and the conductivity of that water. For conventional resistivity logging devices it has been established that the measured formation conductivity is equal to the product of two quantities, one of the quantities being the water-filled porosity of the formations raised to a particular exponent, and the other quantity being the conductivity of the formation water. For most formations, the exponent is generally about 2, so the measured composite formation conductivity varies approximately as the square of the water-filled porosity and varies approximately linearly with the conductivity of the formation water. Using this relationship, along with additional logging or coring information, it is possible to determine the volume or conductivity of the formation water. For example, if water conductivity for a given formation zone is known, one can determine the water-filled porosity of the formations in the zone using the measured formation conductivity and the relationship set forth. Alternatively, if water-filled porosity were a "known", one could determine the formation water conductivity. In both instances, the determination may be directly utilized to draw conclusions or may be combined with or compared to other logging data to obtain useful information about the properties of subsurface formations.

There has been recently developed a logging device which investigates earth formations surrounding a borehole by injecting microwave electromagnetic energy into the formations and then taking measurements which relate to the propagation of the energy in the formations. A form of this device, currently designated as an "electromagnetic propagation" (or "EMP") device is disclosed in the U.S. Pat. No. 3,944,910 of Rau. In operation of the EMP device, injected microwave energy establishes a lateral wave which travels in the formation adjacent the interface between the mudcake and the formations, typically in the so-called invaded zone. Energy from the lateral wave is received at spaced locations and is processed to obtain useful information about the nature of the formations through which the wave energy has passed.

It is an object of the present invention to provide an apparatus and method whereby determinations of conductivity, as obtained from an EMP type of device, can be utilized to determine the porosity of formations and/or the conductivity, apparent conductivity, or saturation of the water in formations surrounding a borehole.

SUMMARY OF THE INVENTION

Applicant has discovered that the conductivity as determined from a microwave electromagnetic propagation ("EMP") type of logging device, and designated $\sigma_{EMP}$, is related to the conductivity of the formation water, designated $\sigma_w$, as a substantially linear function of the water-filled porosity, $\sigma_w$. Another way of stating the discovered relationship is that $\sigma_{EMP}$ is related to the water-filled porosity, $\sigma_w$, as a linear function of the conductivity of the formation water, $\sigma_w$. Expressed as an equation, we have $$\sigma_{EMP} = \sigma_w \sigma_w \quad (1)$$

where, as stated, $\sigma_{EMP}$ is the conductivity as determined from the EMP device, $\sigma_w$ is the water-filled porosity of the formations, and $\sigma_w$ is the conductivity of the formation water and includes both "DC" conductivity and conductivity attributable to dielectric losses. This relationship can be contrasted with the generally accepted relationship for low frequency resistivity or conductivity type logging devices:

$$\sigma_o = \phi_w{}^m \sigma_w \quad (2)$$

where $\sigma_o$ is the conductivity of a formation (as measured with a low frequency resistivity or conductivity type of logging device) fully saturated with water of conductivity $\sigma_w$. For most formations, m generally has a value of about 2, but applicant has found that for an EMP type of device the relationship (1) is applicable; i.e., a porosity exponent of unity.

The present invention is directed to an apparatus and method for determining the water-filled porosity of formations surrounding a borehole. Alternatively, where porosity is known from other logging information, the techniques of the invention can be utilized for determining the conductivity or the apparent conductivity of the water in formations surrounding a borehole. Water saturation can also be determined. The formations are assumed to comprise a matrix, which may be any subsurface solid material, and fluids contained in the matrix, such as in pore spaces or interstices therein. As used herein, the term "water-filled porosity" is intended to mean the fraction of the formation unit volume (matrix plus fluid) occupied by water. In accordance with an embodiment of the invention, means are provided for deriving a first quantity which is representative of the attenuation of microwave electromagnetic energy propagating between spaced locations in the borehole, the first quantity being, for example, the attenuation constant, $\alpha$. Means are also provided for deriving a second quantity representative of the relative phase shift of microwave electromagnetic energy propagating between the spaced locations, the second quantity being, for example, the phase constant, $\beta$. Further means are provided for deriving a third quantity representative of the conductivity of the water in the formations. In the preferred form of the invention, the investigated formations are in the invaded zone surrounding the borehole and the conductivity of the water is determinable from the conductivity of the drilling mud being utilized and the nature of the mud filtrate resulting from invasion of the formations by the drilling mud. Means are also provided for generating a fourth quantity which is proportional to the product of the first and second quantities and inversely proportional to the third quantity. The generated fourth quantity is indicative of the water-filled porosity, $\phi_w$, of the formations adjacent the region of the spaced locations in the borehole.

In alternative forms of the invention, the conductivity, $\sigma_w$, or more typically the apparent water conductivity, $\sigma_w'$, of the water in formations surrounding the borehole are determined. If it is desired to determine $\nu_w$, means are provided for deriving a quantity representative of the water-filled porosity of the formations, this porosity-representative quantity being obtained, for example, in accordance with the techniques set forth in my copending U.S. patent application, Ser. No. 773,996, filed Mar. 3, 1977 and assigned to the same assignee as the present application. In this form of the invention, means are also provided for generating a fifth quantity which is proportional to the product of the first and second quantities and inversely proportional to the derived porosity-indicative quantity. The generated fifth quantity is indicative of the conductivity, $\sigma_w$, of the water in the formations adjacent the region of the spaced locations in the borehole. More typically, it is desired to determine apparent water conductivity, $\sigma_w'$. In such case, means are provided for deriving a quantity representative of the total porosity of the formations, designated $\phi_t$. This quantity may be obtained, for example, from a neutron, density and/or acoustic logging devices such as is disclosed in U.S. Pat. Nos. 3,453,433 and 3,590,228. The fifth quantity is determined in the same way but, in this instance, having employed $\phi_t$ as the porosity-indicative quantity, the generated fifth quantity is indicative of the apparent conductivity, $\sigma_w'$, of the water in the adjacent formations.

Further features and advantages of the invention will become more readily apparent from the following detailed description when taken in conjunction with the accompanying drawings.

DESCRIPTION OF THE PREFERRED EMBODIMENT

Figure 1:
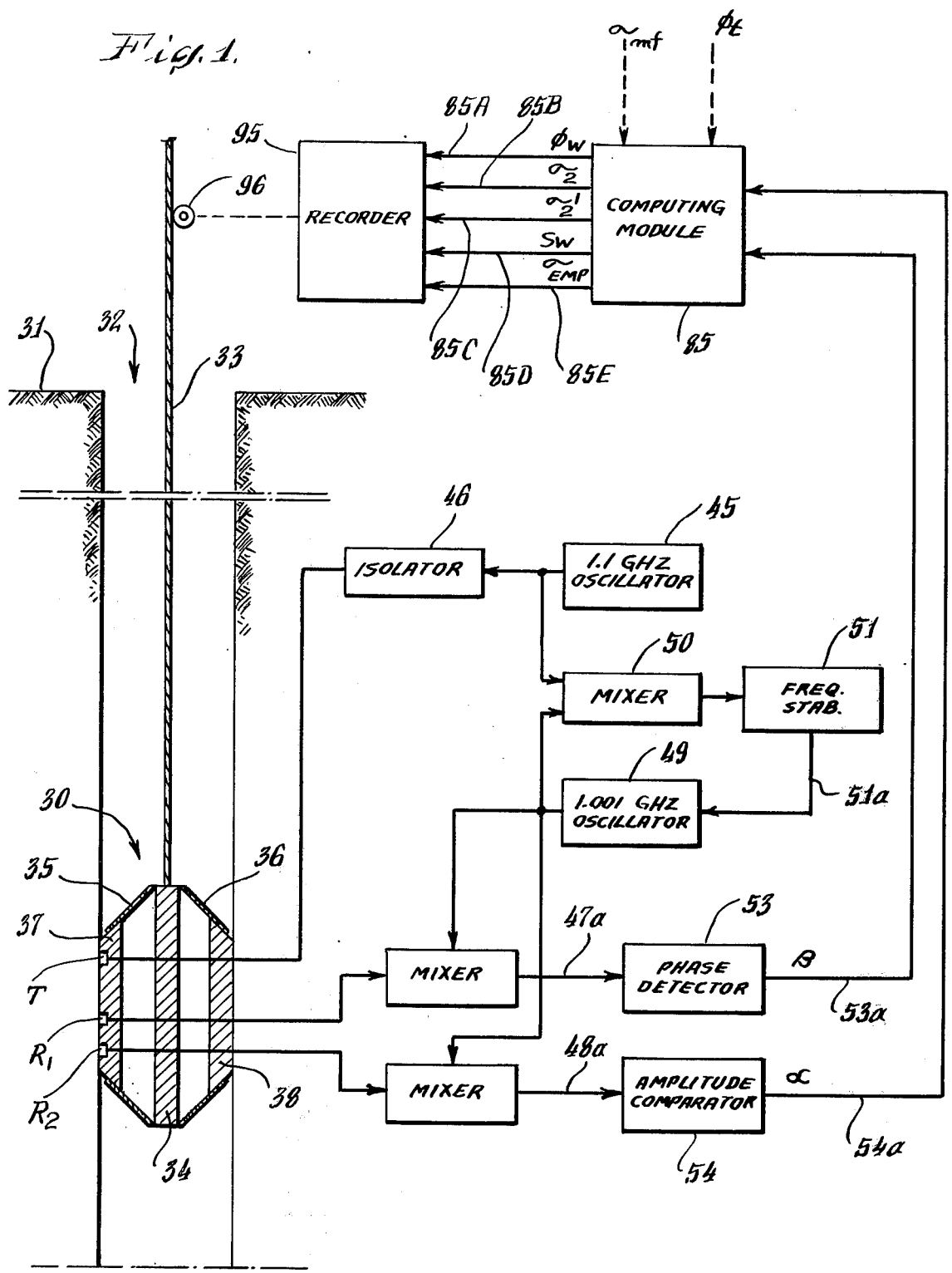
FIG. 1 is a schematic representation, partially in block form, of an apparatus incorporating an embodiment of the invention.

Before proceeding to describe the apparatus and method of the present invention in detail, it is helpful in understanding the invention to review subject matter developed in the above-referenced U.S. Pat. No. 3,944,910 of Rau.

Consider a plane electromagnetic wave propagating in a lossless dielectric medium. The wave propagates with a velocity $$V = 1/\sqrt{\mu\epsilon} \tag{3}$$

where $\mu$ is the magnetic permeability and $\epsilon$ the dielectric constant of the medium. If the type of materials under consideration are generally non-magnetic, $\mu$ can be considered as a known constant and $\epsilon$ can be determined from the relationship $$\epsilon = 1/\mu V^2 \tag{4}$$

Next, consider two points in fixed spaced relation along the direction of propagation of the wave. For a given angular frequency, $\omega$, the phase difference of the wave as between the two points is $$\phi = \omega L/V = \beta L \tag{5}$$

where L is the distance separating the two points and $\beta$ is the phase constant of the wave as defined by $\beta = \omega/V$.

The preceding relationships are valid for a lossless material, but subsurface media of interest generally have appreciable conductivity. The propagation constant, $\gamma$, of a plane electromagnetic wave propagating in a lossy medium is a complex quantity of the form $$\gamma = \omega\sqrt{\mu\epsilon}\sqrt{1 + j\frac{\sigma}{\omega\epsilon}} \tag{6}$$

where $\sigma$ is the conductivity of the medium. For the case where $\sigma$ is zero or very small, the "loss tangent" term $\sigma/\omega\epsilon$ can be neglected and we have $\gamma = \beta = \omega\sqrt{\mu\epsilon}$ which is consistent with equations for the lossless case. When $\sigma$ is significant, however, the loss tangent term can be kept relatively small by selecting $\omega$ relatively large, as described in the referenced Rau patent. As further described therein, measurements of dielectric constant can be corrected for loss tangent.

To better understand the technique utilized herein, it is helpful to initially represent the real and imaginary parts of the propagation constant, $\gamma$, as $\beta$ and $\alpha$, respectively, so we have $$\gamma = \beta + j\alpha \tag{7}$$

where $\alpha$ is associated with wave attenuation or loss. (Note that the propagation constant is used in the well known wave equation in the form $e^{j\gamma}$, so the real part of the propagation constant becomes the imaginary part of the exponent and vice versa.) Squaring equations (6) and (7) and equating the real and imaginary parts of each gives $$\beta^2 - \alpha^2 = \mu\epsilon\omega^2 \tag{8}$$

and $$2\alpha\beta = \mu\sigma\omega \tag{9}$$

Equation (9) can be utilized to determine conductivity as:

$$\sigma = 2\alpha\beta/\mu\omega \tag{10}$$

Applicant has discovered that this conductivity, as determined from a microwave electromagnetic propagation ("EMP") type of logging device, and designated $\sigma_{EMP}$, is related to the conductivity of the formation water, designated $\sigma_w$, as a substantially linear function of the water-filled porosity. As expressed in relationship (1) above:

$$\sigma_{EMP} = \phi_w \sigma_w \tag{1}$$

where, as stated, $\sigma_{EMP}$ is the conductivity as determined from the EMP device, $\phi_w$ is the water-filled porosity of the formations, and $\sigma_w$ is the conductivity of the formation water and includes both "DC" conductivity and conductivity attributable to dielectric losses. Knowing $\sigma_{EMP}$ and one of either $\sigma_w$ or $\phi_w$, the remaining unknown can be determined. To make further use of the discovery of relationship (1), define apparent conductivity, $\sigma_w'$, as $$\sigma_w' = \sigma_w(\phi_w/\phi_t) \quad (11)$$

where $\phi_t$ is the total porosity of the formations. (The quantity $\phi_w/\phi_t$ is the water saturation, $S_w$, i.e. the fraction of the pore spaces which is filled with water.) Solving (11) for $\sigma_w$ and substituting into (1) gives $$\sigma_{EMP} = \sigma_w' \phi_t \quad (12)$$

which is a form of (1), but in terms of apparent water conductivity and total porosity. Relationship (12) can be used, for example, to determine $\sigma_w'$ when $\phi_t$ is known. The determined $\sigma_w'$ can then be used to obtain the water saturation from $$S_w = \phi_w/\phi_t = \sigma_w'/\sigma_w \quad (13)$$

which follows directly from relationship (11), with $\sigma_w$ generally being obtainable from the mud filtrate conductivity. The quantity $S_w$ is of importance since, inter alia, hydrocarbon saturation, $S_{hc}$, is generally equal to $(1-S_w)$. Another way of visualizing these relationships is to recognize that $\sigma_w'$ will equal $\sigma_w$ when $\phi_w = \phi_t$; i.e. a situation where there is 100% water saturation. However, when, for example, hydrocarbons are present (i.e., $\phi_w < \phi_t$), $\sigma_w'$ will be less than $\sigma_w$ by an amount which depends upon the hydrocarbon content.

Referring to FIG. 1, there is shown a representative embodiment of an apparatus in accordance with the present invention for investigating subsurface formations 31 traversed by a borehole 32. The borehole 32 is typically filled with a drilling fluid or mud which contains finely divided solids in suspension. The EMP type of investigating apparatus or logging device 30 is suspended in the borehole 32 on an armored cable 33, the length of which substantially determines the relative depth of the device 30. The cable length is controlled by suitable means at the surface such as a drum and winch mechanism (not shown).

The logging device 30 includes an elongated cylindrical support member 34, the interior portion of which has a fluid-tight housing containing the bulk of the down-hole electronics. Mounted on support member 34 are a pair of bowed springs 35 and 36. The spring 35 has mounted thereon a pad member 37 which contains, inter alia, a transmitting antenna T and vertically spaced receiving antennas $R_1$ and $R_2$. Mounted on the spring 36 is a secondary member 38 which may be an inactive pad that facilitates smooth vertical movement of the device 30 through the borehole. If desired, however, the pad 38 may contain electrodes or other additional means for investigating the surrounding formations. Electronic signals indicative of the information obtained by the logging device are transmitted through the cable 33 to a computing module 85 and recorder 94 located at the surface of the earth. The particular means shown in FIG. 1 for maintaining the antennas in engagement with the borehole wall is illustrative, and it will be appreciated that other suitable means for accomplishing this objective, such as hydraulic means, can be utilized.

Figure 2:
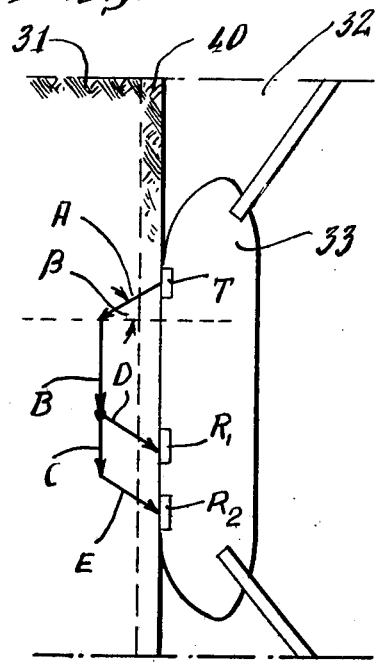
FIG. 2 illustrates, in simplified form, the nature of propagation of a microwave electromagnetic lateral wave in the formations.

FIG. 2 illustrates, in simplified form, the nature of propagation of the electromagnetic wave to be measured with the apparatus of FIG. 1. (For a more detailed description of the wave propagation path, reference can be made to the Rau U.S. Pat. No. 3,944,910). In FIG. 2 the pad 37 is shown positioned against the side of the borehole 32 which, as above-stated, is filled with a drilling mud. Generally, the fluid pressure in the formations traversed by a borehole is less than the hydrostatic pressure of the column of mud in the borehole, so that the mud and mud filtrate flow somewhat into the formations. The formations tend to screen the small particles suspended in the mud so that a mudcake is formed on the walls of the borehole. The thickness of the mudcake varies with formation parameters such as permeability, but at least a very thin mudcake is usually present on the borehole wall. In FIG. 2, the pad 37 contacts a mudcake 40 which is shown as being of exaggerated scale thickness for illustrative clarity.

The transmitting antenna T emits microwave electromagnetic energy into the formation as represented by the arrow A. A resultant surface wave propagating in the formation is represented by the arrow B and its extension, arrow C. The surface wave continuously sheds energy back into the more lossy media (the mudcake), and the portions of energy which are shed at the approximate locations of the receivers $R_1$ and $R_2$ are represented by the arrows D and E, respectively. If the pathlengths represented by arrows D and E are assumed to be substantially equal, it is seen that the difference in pathlength between the energy received at $R_1$ (via path A-B-D) and the energy received at $R_2$ (via path A-B-C-E) is the distance represented by arrow C; i.e., the distance between the receivers. Accordingly, a differential receiver arrangement allows investigation of the portion of the formation lying approximately opposite the separation between $R_1$ and $R_2$. Typically, but not necessarily, the investigated formation will be the "flushed" or "invaded" zone which surrounds the mudcake in the borehole and contains fluids from the mud which filter through the mudcake.

Referring again to FIG. 1, the downhole electronics contained within the member 34 are shown, for convenience of illustration, at the side of the borehole. A solid state oscillator 45 provides output energy in the microwave region of the spectrum. The microwave region is defined herein as including the range of frequencies between about 300 MHz and 300 GHz. The oscillator 45 may operate at the suitable frequency of 1.1 GHz; i.e., $1.1 \times 10^9$ cycles per second. The output of oscillator 45 is coupled through an isolator 46 to the transmitting antenna T. Microwave energy is transmitted into the surrounding formations and propagates through the formations in the manner previously described. The energy which arrives at the receiving antenna $R_1$ and $R_2$ is respectively coupled to input terminals of the mixers 47 and 48. The signals which arrive from $R_1$ and $R_2$ are out of phase with each other by an amount which depends on the phase constant $\beta$ and have an amplitude ratio which depends upon the attenuation constant $\alpha$. Secondary input terminals of the mixers are supplied with microwave energy at a frequency that is separated from the transmitter frequency by some relatively low frequency which is typically in the radio frequency range. In the embodiment shown, a solid state oscillator 49 supplies microwave energy to mixers 47 and 48 at a frequency of 1.1001 GHz, or 100 KHz above the transmitter frequency. The output signals 47A and 48A of the mixers 47 and 48 therefore contain the difference frequency of 100 KC. In accordance with well known principles, the signals 47A and 48A maintain the phase and amplitude relationships of the signals from R$_1$ and R$_2$, but the task of phase detection is greatly facilitated at the lower frequency of the mixed signals. To insure that the difference frequency between the outputs of the oscillators 45 and 49 remains at 100 KHz, the oscillator outputs are sampled and fed to a mixer 50. The output of the mixer is received by a frequency stabilization circuit 51 which detects drifts from the 100 KC standard and generates a correction signal 51A which controls oscillator 49 in the manner of a conventional "phase-locked loop".

Figure 3:
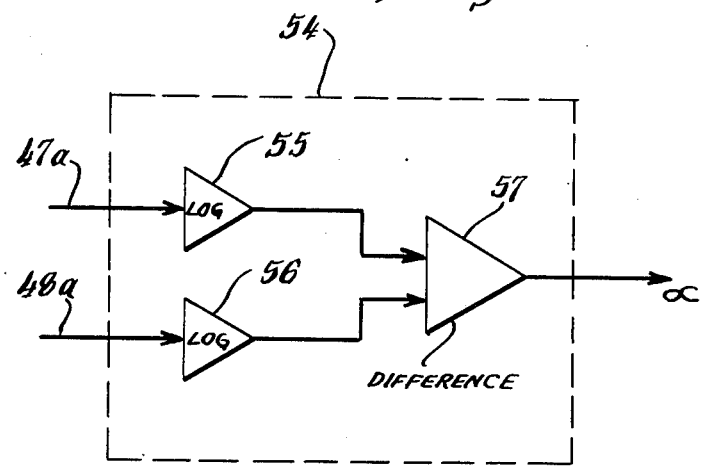
FIG. 3 is a block diagram of the amplitude comparator of FIG. 1.

The signals 47A and 48A are applied to a phase detector circuit 53 and to an amplitude comparator 54. The output of the phase detector 53 is a signal level which is proportional to the phase difference $\phi$ between the signals received at R$_1$ and R$_2$, and thus proportional to $\beta$ in accordance with $\beta = \phi/L$, where L is the distance separating the two receivers. (For a particular frequency of operation, $\omega$, the phase difference $\phi$ is also proportional to the travel time through the formations over the distance L in accordance with $t_{p1} = \phi/L\omega$, where $t_{p1}$ is the travel time.) The output of amplitude comparator 54 is a signal level which is proportional to the attenuation constant $\alpha$. A convenient circuit 54 for obtaining an output signal proportional to $\alpha$ is shown in FIG. 3. The signals 47A and 48A are respectively applied to the logarithmic amplifiers 55 and 56 whose outputs are fed to the difference amplifier 57. The output of the difference amplifier 57 is a signal level proportional to $\alpha$. This can be visualized by representing the amplitude of the wave energy received at R$_1$ as $Ae^{-\alpha z}$, where A is an amplitude constant and z is the distance separating T and R$_1$. It follows that the amplitude of the wave energy received at R$_2$ is $Ae^{-\alpha(z+L)}$, where L is the distance separating the receivers R$_1$ and R$_2$. The ratio of the wave amplitudes at the two receivers is therefore $$\frac{Ae^{-\alpha(z+L)}}{Ae^{-\alpha z}} = e^{-\alpha L}$$

The log of the ratio of the wave amplitudes is therefore proportional to $\alpha$. It will be appreciated that the circuit 54 of FIG. 3 accomplishes the same mathematical result by taking the difference of the logs of the wave amplitudes.

The outputs representative of $\beta$ and $\alpha$ are transmitted to the surface over the conductor pair 52a and 54a which in actuality pass through the armored cable 33. Typically, these signals may be DC levels which are stepped-up by amplification before transmission to the surface. At the surface of the earth the signals on the lines 53a and 54a are applied to the computing module 85 which computes the water-filled porosity, $\phi_w$, of the formations in accordance with the relationship (1). Alternatively, the water conductivity, $\phi_w$, of the formations is computed in accordance with relationship (1), or the apparent water conductivity is computed in accordance with relationship (12). The computed porosity (line 85A) and/or water conductivity (line 85B) and/or apparent water conductivity (line 85C) is recorded by a recorder 94 that is conventionally driven as a function of borehole depth by mechanical coupling to a rotating wheel 96. The wheel 96 is coupled to the cable 33 and rotates in synchronism therewith so as to move as a function of borehole depth. Thus $\phi_w$ and/or $\sigma_w$ and/or $\sigma_w'$ are recorded as a function of borehole depth by the recorder 95.

Figure 4A:
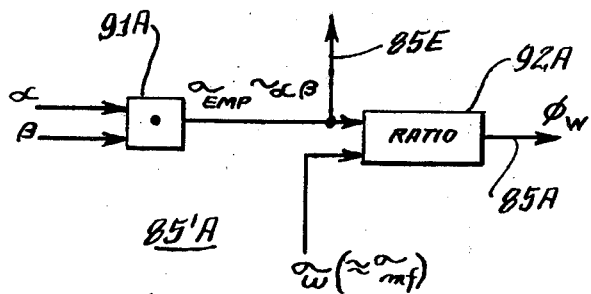
FIG. 4A is a block diagram of one form of the computing module of FIG. 1.
Figure 4B:
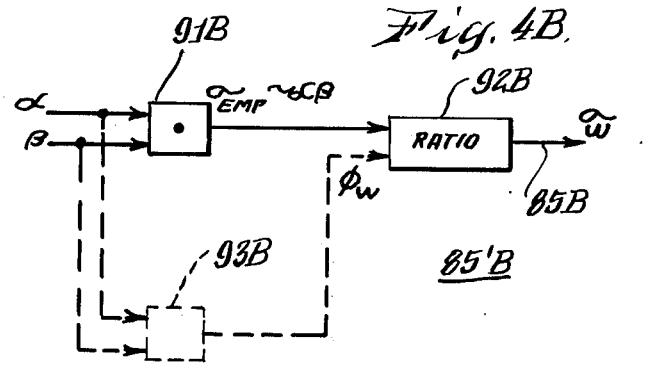
FIG. 4B is a block diagram of another form of the computing module of FIG. 1.
Figure 4C:
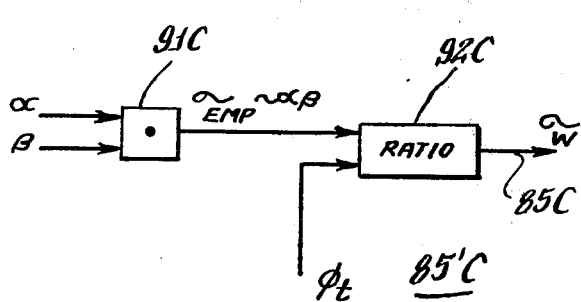
FIG. 4C is a block diagram of another form of the computing module of FIG. 1.

FIGS. 4A, 4B and 4C are block diagrams of alternative forms of the computing module 85 which receives the signals on lines 53A and 54A that are indicative of the measured values of $\beta$ and $\alpha$, respectively. In FIG. 4A, the computing module is designated 85'A and the received signals are coupled to a multiplier 91A which generates an output proportional to $\sigma_{EMP}$, in accordance with the equation (10). (The signal representative of $\sigma_{EMP}$ can, if desired, be recorded by recorder 95, as indicated by line 85E.) This signal is, in turn, coupled to one input of a ratio circuit 92A, the other input of which receives a signal representative of $\sigma_w$, that is, the conductivity of the formation water. In the described type of EMP logging device, the detected microwave energy has generally propagated through the formation invaded zone, so a suitable value for $\sigma_w$ is the conductivity of the drilling mud filtrate. Accordingly, the signal level representing the quantity $\sigma_w$ may typically be selected in accordance with the conductivity of the mud filtrate, $\sigma_{mf}$. The output of the ratio circuit 92A is a signal representative of the quantity $\phi_w$; i.e., the water-filled porosity of the investigated formations, as follows from relationship (1). As used herein, the water-filled porosity $\phi_w$ is defined as the fraction of water per unit volume of the total or bulk formation and is therefore a measure of the amount of water in the formation. In this sense, the term water-filled porosity is interchangeable with terms expressing the amount, volume or fraction of water in the formation. When $\phi_w$ is less than $\phi_t$ (i.e., $S_w < 1$—see relationship (13)), the presence of hydrocarbons may be indicated.

In FIG. 4B there is shown another form of the computing module, designated 85'B, utilized to determine the water conductivity $\sigma_w$. This determination may typically be made when $\sigma_w$ is unknown or, alternatively, where $\sigma_w$ is a known value (such as the mud filtrate's conductivity for the invaded zone) but it is desired to have a comparative determination which can be used to detect conditions which would cause a deviation from an expected value. A multiplier circuit and a ratio circuit are again employed, these circuits being designated as 91B and 92B, respectively. One input to the ratio circuit is again a signal representative of $\sigma_{EMP}$. In this case, however, the other input to ratio circuit 92B is a signal representative of the water-filled porosity of the formations, $\phi_w$, as is evident from the relationship (1) above. The signal representative of $\phi_w$ may be obtained from the attenuation and phase measurements of the EPT device in accordance with the technique set forth in applicant's copending U.S. patent application Ser. No. 773,996 filed Mar. 3, 1977 and assigned to the same assignee as the present application. The generation of $\phi_w$ in accordance with the referenced technique is represented in the FIG. 4B by the block 93, this block and the inputs thereto being shown in dashed line.

Figure 4D:
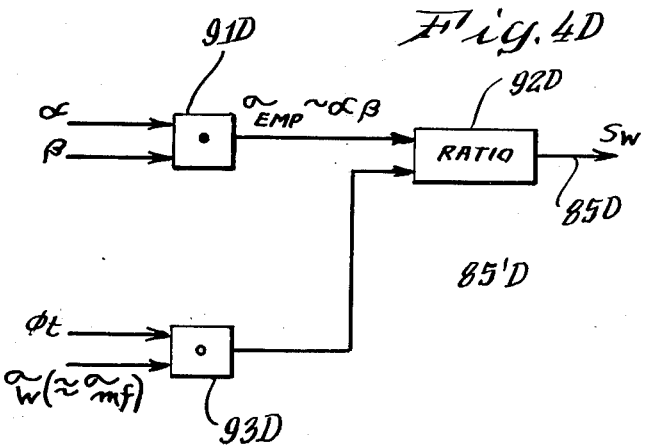
FIG. 4D is a block diagram of still another form of the computing module of FIG. 1.

In FIG. 4C there is shown another form of the computing module, designated 85'C, utilized to determine apparent water conductivity, $\sigma_w'$. Once again, a multiplier circuit and a ratio circuit are employed, these circuits being designated by the reference numerals 91C and 92C in FIG. 4C. One input to the ratio circuit is again a signal representative of $\sigma_{EMP}$. In the embodiment of FIG. 4C, however, the other input to ratio circuit 92C is a signal representative of the total porosity of the formations, $\phi_t$, as is evident from the relationship (12) above. A signal representative of the total porosity of the formations may be derived, for example, from neutron, density, and/or acoustic logging information, as is disclosed in the U.S. Pat. Nos. 3,453,433 or 3,590,228. FIG. 4D illustrates a still further possible implementation of the computing module 85 which derives from the discovered relationship (1). As discussed above, when $\sigma_w$ is known (such as the value of $\sigma_{mf}$), the obtained value of apparent water conductivity, $\sigma_w'$, (such as derived using the computing module of FIG. 4C) can be utilized as an indication of water saturation. Another way of visualizing this is to solve relationship (13) for $\phi_w$ which gives $$\sigma_w = S_w \phi_t \quad (14)$$

Substituting for $\phi_w$ in (1) gives $$S_w = \sigma_{EMP} / \phi_t \sigma_w$$

In FIG. 4D, a multiplier and a ratio circuit, 91D and 92D, respectively, are again provided. The other input to ratio circuit 92D is the output of a multiplier 93D which receives as its inputs signals representative of $\phi_t$ and $\sigma_w$. It is thus seen that the output of ratio circuit 92D is a signal representative of $S_w$, and this signal can be applied to the recorder 95 on the line 85D.

The invention has been described with reference to a particular embodiment, but variations within the spirit and scope of the invention will occur to those skilled in the art. For example, while circuitry has been described for generating analog signals representative of the desired quantities, it will be understood that a general purpose digital computer could readily be programmed to implement the techniques as set forth herein. Also, it should be noted that the advantageous principles of known borehole compensation techniques and/or of redundant processing channels, such as are disclosed in U.S. Pat. No. 3,849,721, can be utilized, if desired, in conjunction with the present invention. It will be understood that the measured values can, if desired, be corrected for mudcake effect, spreading, or temperature variations, as is known in the art. Further, along the illustrative embodiment shows various quantities as being derived directly from a logging device, these quantities may alternatively be derived from storage media or communicated from a logging location. Finally, while conductivity values have been utilized for purposes of illustration, it will be recognized that the inverses of values utilized herein could be employed in conjuction with the inverse of conductivity; i.e., resistivity.

I claim:

1. Apparatus for determining the water-filled porosity of formations surrounding a borehole, comprising:
    means for deriving a first quantity representative of the attenuation of microwave electromagnetic energy propagating between spaced locations in the borehole;
    means for deriving a second quantity representative of the relative phase shift of microwave electromagnetic energy propagating between spaced locations in the borehole;
    means for deriving a third quantity representative of the conductivity of the water in the formations surrounding said spaced locations; and
    means for generating a fourth quantity which is proportional to the product of said first and second quantities and inversely proportional to said third quantity;
    said fourth quantity being indicative of the water-filled porosity of said formations.

2. Apparatus as defined by claim 1 wherein said first quantity is the attenuation constant of said microwave electromagnetic energy propagating between said spaced locations in the borehole.

3. Apparatus as defined by claim 1 wherein said second quantity is the phase constant of said microwave electromagnetic energy propagating between said spaced locations in the borehole.

4. Apparatus as defined by claim 2 wherein said second quantity is the phase constant of said microwave electromagnetic energy propagating between said spaced locations in the borehole.

5. Apparatus as defined by claim 1 wherein said borehole is filled with drilling mud and said third quantity is the conductivity of the mud filtrate in the formations invaded by said drilling mud.

6. Apparatus as defined by claim 4 wherein said borehole is filled with drilling mud and said third quantity is the conductivity of the mud filtrate in the formations invaded by said drilling mud.

7. Apparatus as defined by claim 1 wherein said microwave electromagnetic energy has a frequency of about 1.1 GHz.

8. Apparatus as defined by claim 4 wherein said microwave electromagnetic energy has a frequency of about 1.1 GHz.

9. Apparatus as defined by claim 6 wherein said microwave electromagnetic energy has a frequency of about 1.1 GHz.

10. Apparatus for determining the conductivity of the water in formations surrounding a borehole, comprising:
    means for deriving a first quantity representative of the attenuation of microwave electromagnetic energy propagating between spaced locations in the borehole;
    means for deriving a second quantity representative of the relative phase shift of microwave electromagnetic energy propagating between said spaced locations in the borehole;
    means for deriving a third quantity representative of the porosity of the formations surrounding said spaced locations; and
    means for generating a fourth quantity which is proportional to the product of said first and second quantities and inversely proportional to said third quantity;
    said fourth quantity being indicative of the conductivity of the water in said formations.

11. Apparatus as defined by claim 10 wherein said third quantity is representative of the water-filled porosity of said formations.

12. Apparatus as defined by claim 10 wherein said third quantity is representative of the total porosity of said formations and said fourth quantity is indicative of the apparent conductivity of the water in said formations.

13. Apparatus as defined by claim 10 wherein said first quantity is the attenuation constant of said microwave electromagnetic energy propagating between said spaced locations in the borehole.

14. Apparatus as defined by claim 10 wherein said second quantity is the phase constant of said microwave electromagnetic energy propagating between said spaced locations in the borehole.

15. Apparatus as defined by claim 13 wherein said second quantity is the phase constant of said microwave electromagnetic energy propagating between said spaced locations in the borehole.

16. Apparatus as defined by claim 10 wherein said microwave electromagnetic energy has a frequency of about 1.1 GHz.

17. Apparatus as defined by claim 15 wherein said microwave electromagnetic energy has a frequency of about 1.1 GHz.

18. Apparatus for determining the water-filled porosity of formations surrounding a borehole, comprising:
  means for injecting microwave electromagnetic energy into the formations;
  means for measuring a first quantity representative of the attenuation of microwave electromagnetic energy propagating between spaced locations in the borehole;
  means for measuring a second quantity representative of the relative phase shift of microwave electromagnetic energy propagating between said spaced locations in the borehole;
  means for deriving a third quantity representative of the conductivity of the water in the formations surrounding said spaced locations; and
  means for generating a fourth quantity which is proportional to the product of said first and second quantities and inversely proportional to said third quantity;
  said fourth quantity being indicative of the water-filled porosity of said formations.

19. Apparatus as defined by claim 18 wherein said first quantity is the attenuation constant of said microwave electromagnetic energy propagating between said space locations in the borehole.

20. Apparatus as defined by claim 18 wherein said second quantity is the phase constant of said microwave electromagnetic energy propagating between said spaced locations in the borehole.

21. Apparatus as defined by claim 20 wherein said second quantity is the phase constant of said microwave electromagnetic energy propagating between said spaced locations in the borehole.

22. Apparatus as defined by claim 18 wherein said borehole is filled with drilling mud and said third quantity is the conductivity of the mud filtrate in the formations invaded by said drilling mud.

23. Apparatus as defined by claim 21 wherein said borehole is filled with drilling mud and said third quantity is the conductivity of the mud filtrate in the formations invaded by said drilling mud.

24. Apparatus as defined by claim 18 wherein said microwave electromagnetic energy has a frequency of about 1.1 GHz.

25. Apparatus as defined by claim 21 wherein said microwave electromagnetic energy has a frequency of about 1.1 GHz.

26. Apparatus as defined by claim 23 wherein said microwave electromagnetic energy has a frequency of about 1.1 GHz.

27. Apparatus for determining the conductivity of the water in formations surrounding a borehole, comprising:
  means for injecting microwave electromagnetic energy into the formations;
  means for measuring a first quantity representative of the attenuation of microwave electromagnetic energy propagating between spaced locations in the borehole;
  means for measuring a second quantity representative of the relative phase shift of microwave electromagnetic energy propagating between said spaced locations in the borehole;
  means for deriving a third quantity representative of the porosity of the formations surrounding said spaced locations; and
  means for generating a fourth quantity which is proportional to the product of said first and second quantities and inversely proportional to said third quantity;
  said fourth quantity being indicative of the conductivity of the water in said formations.

28. Apparatus as defined by claim 27 wherein said third quantity is representative of the water-filled porosity of said formations.

29. Apparatus as defined by claim 27 wherein said third quantity is representative of the total porosity of said formations and said fourth quantity is indicative of the apparent conductivity of the water in said formations.

30. Apparatus as defined by claim 27 wherein said first quantity is the attenuation constant of said microwave electromagnetic energy propagating between said spaced locations in the borehole.

31. Apparatus as defined by claim 27 wherein said second quantity is the phase constant of said microwave electromagnetic energy propagating between said spaced locations in the borehole.

32. Apparatus as defined by claim 30 wherein said second quantity is the phase constant of said microwave electromagnetic energy propagating between said spaced locations in the borehole.

33. Apparatus as defined by claim 27 wherein said microwave electromagnetic energy has a frequency of about 1.1 GHz.

34. Apparatus as defined by claim 32 wherein said microwave electromagnetic energy has a frequency of about 1.1 GHz.

35. A method for determining the water-filled porosity of formations surrounding a borehole, comprising the steps of:
  deriving a first quantity representative of the attenuation of microwave electromagnetic energy propagating between spaced locations in the borehole;
  deriving a second quantity representative of the relative phase shift of microwave electromagnetic energy propagating between said spaced locations in the borehole;
  deriving a third quantity representative of the conductivity of the water in the formations surrounding said spaced locations; and
  generating a fourth quantity which is proportional to the product of said first and second quantities and inversely proportional to said third quantity;
  said fourth quantity being indicative of the water-filled porosity of said formations.

36. The method as defined by claim 35 wherein said first quantity is the attenuation constant of said microwave electromagnetic energy propagating between said spaced locations in the borehole.

37. The method as defined by claim 35 wherein said second quantity is the phase constant of said microwave electromagnetic energy propagating between said spaced locations in the borehole.

38. The method as defined by claim 36 wherein said second quantity is the phase constant of said microwave electromagnetic energy propagating between said spaced locations in the borehole.

39. The method as defined by claim 35 wherein said borehole is filled with drilling mud and said third quantity is the conductivity of the mud filtrate in the formations invaded by said drilling mud.

40. The method as defined by claim 38 wherein said borehole is filled with drilling mud and said third quantity is the conductivity of the mud filtrate in the formations invaded by said drilling mud.

41. The method as defined by claim 35 wherein said microwave electromagnetic energy has a frequency of about 1.1 GHz.

42. The method as defined by claim 38 wherein said microwave electromagnetic energy has a frequency of about 1.1 GHz.

43. The method as defined by claim 40 wherein said microwave electromagnetic energy has a frequency of about 1.1 GHz.

44. A method for determining the conductivity of the water in formations surrounding a borehole, comprising the steps of:
   deriving a first quantity representative of the attenuation of microwave electromagnetic energy propagating between spaced locations in the borehole;
   deriving a second quantity representative of the relative phase shift of microwave electromagnetic energy propagating between said spaced locations in the borehole;
   deriving a third quantity representative of the porosity of the formations surrounding said spaced locations; and
   generating a fourth quantity which is proportional to the product of said first and second quantities and inversely proportional to said third quantity;
   said fourth quantity being indicative of the conductivity of the water in said formations.

45. The method as defined by claim 44 wherein said third quantity is representative of the water-filled porosity of said formations.

46. The method as defined by claim 44 wherein said third quantity is representative of the total porosity of said formations and said fourth quantity is indicative of the apparent conductivity of the water in said formations.

47. The method as defined by claim 44 wherein said first quantity is the attenuation constant of said microwave electromagnetic energy propagating between said spaced locations in the borehole.

48. The method as defined by claim 44 wherein said second quantity is the phase constant of said microwave electromagnetic energy propagating between said spaced locations in the borehole.

49. The method as defined by claim 47 wherein said second quantity is the phase constant of said microwave electromagnetic energy propagating between said spaced locations in the borehole.

50. The method as defined by claim 44 wherein said microwave electromagnetic energy has a frequency of about 1.1 GHz.

51. The method as defined by claim 47 wherein said microwave electromagnetic energy has a frequency of about 1.1 GHz.

52. A method for determining the water-filled porosity of formations surrounding a borehole, comprising the steps of:
   injecting microwave electromagnetic energy into the formations;
   measuring a first quantity representative of the attenuation of microwave electromagnetic energy propagating between spaced locations in the borehole;
   measuring a second quantity representative of the relative phase shift of microwave electromagnetic energy propagating between said spaced locations in the borehole;
   deriving a third quantity representative of the conductivity of the water in the formations surrounding said spaced locations; and
   generating a fourth quantity which is proportional to the product of said first and second quantities and inversely proportional to said third quantity;
   said fourth quantity being indicative of the water-filled porosity of said formations.

53. The method as defined by claim 52 wherein said first quantity is the attenuation constant of said microwave electromagnetic energy propagating between said spaced locations in the borehole.

54. The method as defined by claim 52 wherein said second quantity is the phase constant of said microwave electro-magnetic energy propagating between said spaced locations in the borehole.

55. The method as defined by claim 52 wherein said borehole is filled with drilling mud and said third quantity is the conductivity of the mud filtrate in the formations invaded by said drilling mud.

56. The method as defined by claim 52 wherein said microwave electromagnetic energy has a frequency of about 1.1 GHz.

57. A method for determining the conductivity of the water in formations surrounding a borehole, comprising the steps of:
   injecting microwave electromagnetic energy into the formations;
   measuring a first quantity representative of the attenuation of microwave electromagnetic energy propagating between spaced locations in the borehole;
   measuring a second quantity representative of the relative phase shift of microwave electromagnetic energy propagating between said spaced locations in the borehole;
   deriving a third quantity representative of the porosity of the formations surrounding said spaced locations; and
   generating a fourth quantity which is proportional to the product of said first and second quantities and inversely proportional to said third quantity;
   said fourth quantity being indicative of the conductivity of the water in said formations.

58. The method as defined by claim 57 wherein said third quantity is representative of the water-filled porosity of said formations.

59. The method as defined by claim 57 wherein said third quantity is representative of the total porosity of said formations and said fourth quantity is indicative of the apparent conductivity of the water in said formations.

60. The method as defined by claim 57 wherein said first quantity is the attenuation constant of said microwave electromagnetic energy propagating between said spaced locations in the borehole.

61. The method as defined by claim 57 wherein said second quantity is the phase constant of said microwave electromagnetic energy propagating between said spaced locations in the borehole.

62. The method as defined by claim 57 wherein said microwave electromagnetic energy has a frequency of about 1.1 GHz.

63. Apparatus for determining the water-filled porosity of formations surrounding a particular location in a borehole, comprising:
 means for deriving the conductivity, $\sigma_{EMP}$, of said formations as measured by a microwave electromagnetic propagation logging device;
 means for deriving the water conductivity, $\sigma_w$, of said formations; and
 means for generating a quantity which is substantially proportional to the ratio of $\sigma_{EMP}$ to $\sigma_w$, said quantity being indicative of the water-filled porosity of said formations.

64. Apparatus as defined by claim 63 wherein said borehole is filled with drilling mud and wherein $\sigma_w$ is derived from the conductivity of the mud filtrate in the formations invaded by said drilling mud.

65. Apparatus for determining the conductivity of the water in formations surrounding a particular location in a borehole, comprising:
 means for deriving the conductivity, $\sigma_{EMP}$, of said formations as measured by a microwave electromagnetic propagation logging device;
 means for deriving the water-filled porosity, $\phi_w$, of said formations; and
 means for generating a quantity which is substantially proportional to the ratio of $\sigma_{EMP}$ to $\phi_w$, said quantity being indicative of the conductivity of the water in said formations.

66. Apparatus for determining the apparent conductivity of the water in formations surrounding a particular location in a borehole, comprising:
 means for deriving the conductivity, $\sigma_{EMP}$, of said formations as measured by microwave electromagnetic propagation logging device;
 means for deriving the total porosity, $\phi_t$, of said formations; and
 means for generating a quantity which is substantially proportional to the ratio of $\sigma_{EMP}$ to $\phi_t$; said quantity being indicative of the apparent conductivity of the water in said formations.

67. Apparatus for determining the water saturation of formations surrounding a particular location in a borehole, comprising:
 means for deriving the conductivity, $\sigma_{EMP}$, of said formations as measured by a microwave electromagnetic propagation logging device;
 means for deriving the water conductivity, $\sigma_w$, of said formations;
 means for deriving the total porosity, $\sigma_t$, of said formations; and
 means for generating a quantity which is substantially proportional to $\sigma_{EMP}$ and substantially inversely proportional to the product of $\sigma_w$ and $\phi_t$; said quantity being indicative of the water saturation of said formations.

68. Apparatus as defined by claim 67 wherein said borehole is filled with drilling mud and wherein $\sigma_w$ is derived from the conductivity of the mud filtrate in the formations invaded by said drilling mud.

* * * * *

UNITED STATES PATENT AND TRADEMARK OFFICE
CERTIFICATE OF CORRECTION

PATENT NO. : 4,158,165
DATED : June 12, 1979
INVENTOR(S) : George R. Coates

It is certified that error appears in the above-identified patent and that said Letters Patent are hereby corrected as shown below:

col. 1, line 17 change "coductivity" to --conductivity-- col. 2, line 8 change "$\sigma_w$" to --$\phi_w$-- col. 2, line 10 change "$\sigma_w$" to --$\phi_w$-- col. 2, line 14 equation (1) should be --$\sigma_{EMP} = \phi_w \sigma_w$-- col. 3, line 8 change "$\nu_w$" to --$\sigma_w$-- col. 8, line 61 change "93" to --93B-- col. 9, line 19 in equation (14) change "$\sigma_w$" to --$\phi_w$-- col. 11, line 42 change "space" to --spaced-- col. 16, line 11 after "by" insert --a-- col. 16, line 27 change "$\sigma_t$" to --$\phi_t$--

Signed and Sealed this

Ninth Day of October 1979

[SEAL]

Attest:

RUTH C. MASON
Attesting Officer

LUTRELLE F. PARKER
Acting Commissioner of Patents and Trademarks